March 20, 1945.    A. D. FORBES    2,372,067
ELECTRICAL APPARATUS
Filed July 12, 1940    3 Sheets-Sheet 1

WITNESSES:
N. F. Sussey
Nm. C. Groove

INVENTOR
Allan D. Forbes.
BY Franklin E. Hardy
ATTORNEY

March 20, 1945. A. D. FORBES 2,372,067
ELECTRICAL APPARATUS
Filed July 12, 1940 3 Sheets-Sheet 2
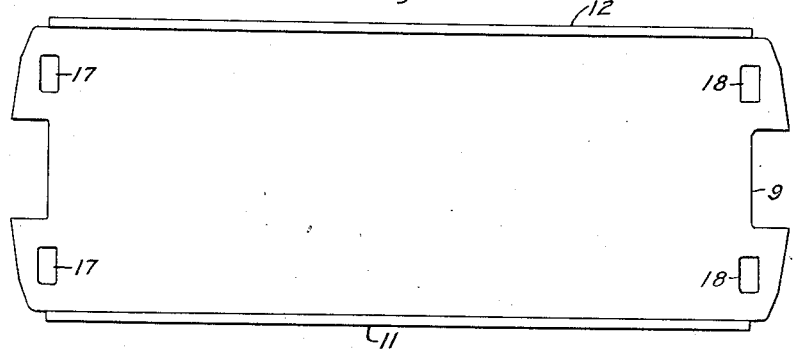
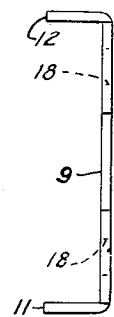
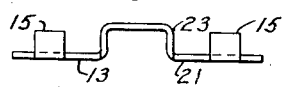
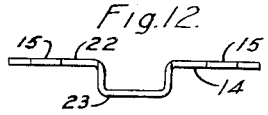
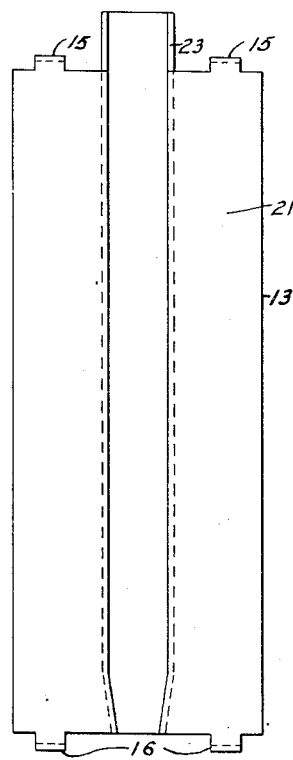
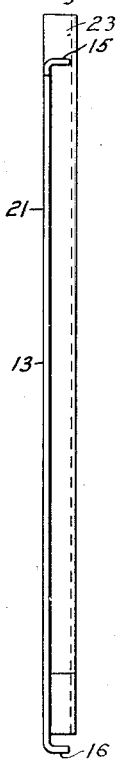
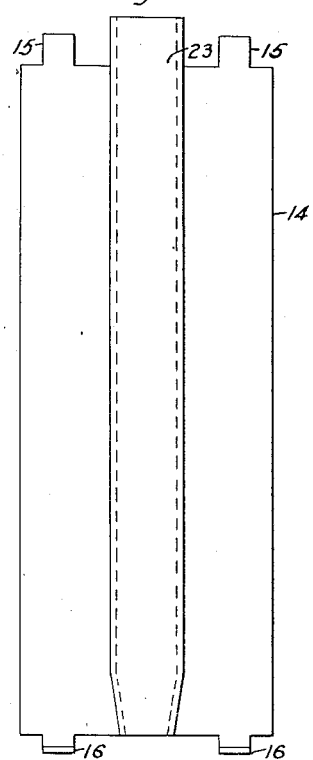
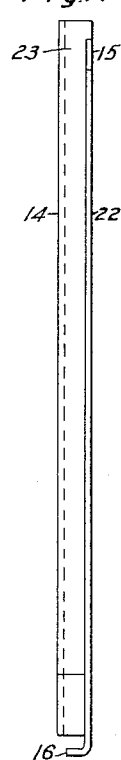
WITNESSES:
N. F. Susser
Nw. C. Groome
INVENTOR
Allan D. Forbes.
BY Franklin E. Hardy
ATTORNEY

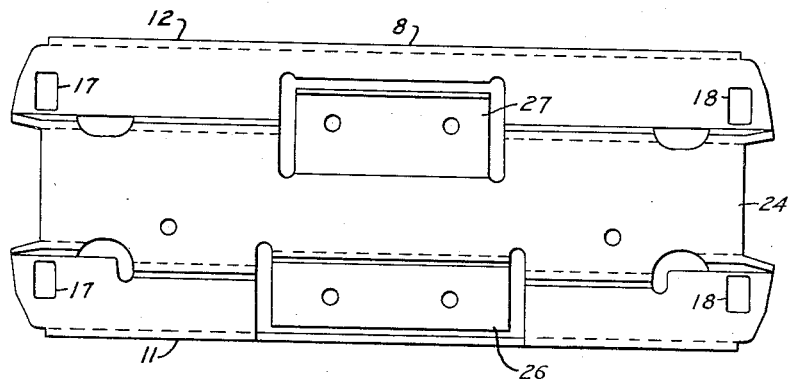
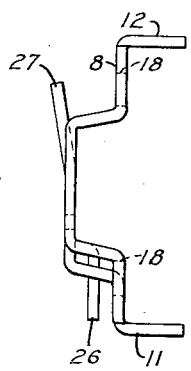
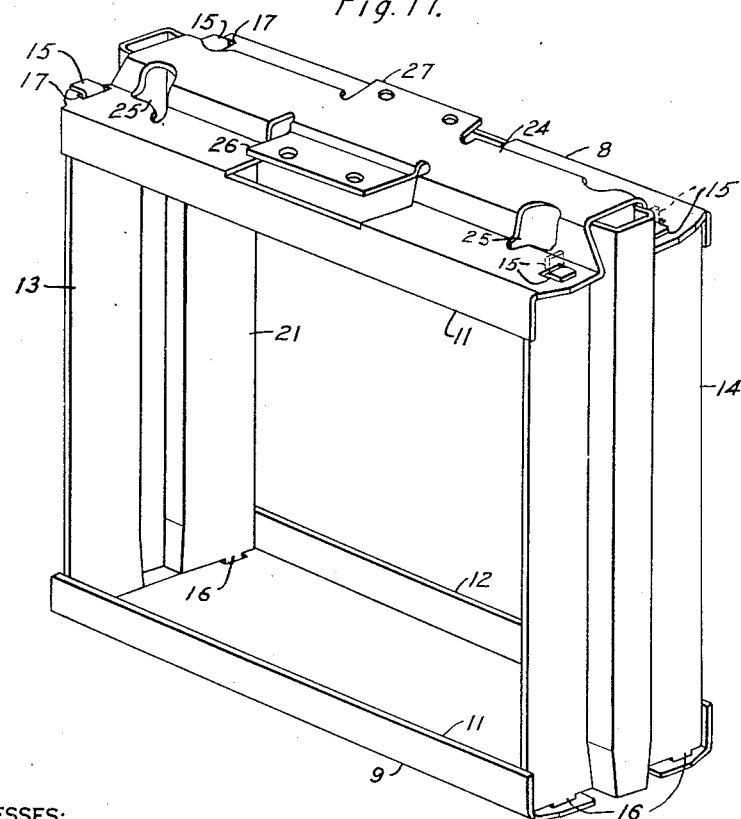

Patented Mar. 20, 1945

2,372,067

UNITED STATES PATENT OFFICE 2,372,067

ELECTRICAL APPARATUS

Allan D. Forbes, Sharon, Pa., assignor to Westinghouse Electric & Manufacturing Company, East Pittsburgh, Pa., a corporation of Pennsylvania Application July 12, 1940, Serial No. 345,081

3 Claims. (Cl. 175—356)

This invention relates to electrical apparatus and a method of assembling the same, and particularly to the structure and assembly of magnetic cores and end frames therefor.

In alternating-current electrical apparatus, such as transformers or the like, employing inductively related windings and a core of magnetic material, it is customary to construct the magnetic core of a plurality of thin sheets of magnetic steel and to provide end frames for holding the assembled steel sheets or laminations together. The steel laminations are so arranged as to provide a magnetic core structure having windows therein for accommodating the windings that are positioned about the winding leg of the core.

A typical end frame consists of channel members arranged on opposite sides of the stack of sheet steel laminations, the channel members being connected together by bolts or similar members extending either through the core or past the edge of the core structure between the channels on opposite sides of the stack. These end frames require a considerable effort to assemble and adjust.

It is an object of my invention to provide an end frame for magnetic core structures that is of light weight, simple in construction, easy to assemble and rugged in its effectiveness to retain the parts of the assembled core structure in their proper relation in the completed structure.

It is a further object of the invention to provide a method of assembling magnetic core structures and end frames therefor.

More specifically, it is an object of the invention to provide an end frame which consists of a plurality of members so constructed and arranged as to be readily assembled about the edges of the core and attached to each other to form a continuous band or chain thereabout, thus to avoid the necessity of using bolts, rivets, or similar means to connect the separate channels or other members on opposite sides of the stack of core laminations.

Other objects and advantages of the invention will be apparent from the following description of a preferred embodiment thereof, reference being had to the accompanying drawings, in which.

Figs. 7 to 16 are detail views of the several members comprising the end frame—Figs. 7 and 8 being top plan and end views, respectively, of the bottom member of the frame; Figs. 9, 10 and 11 being plan, rear elevation and side elevational views, respectively, of one of the side frame members; Figs. 12, 13 and 14 being plan front elevation, and side elevational views, respectively, of the other side end frame member; and Figs. 15 and 16 being top plan and end views, respectively, of the upper end frame member; and Fig. 17 is a perspective view of the assembled end frame comprising the parts shown in Figs. 7 to 16 with the core structure omitted.

Figure 1:
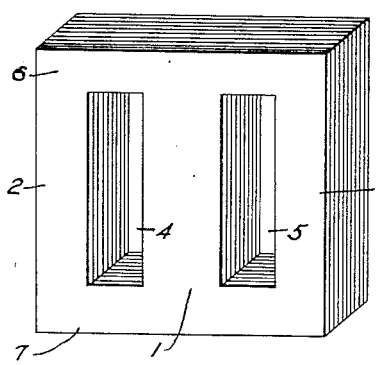
Figure 1 is a perspective view of a stack of laminations of magnetic sheet steel comprising a core structure, such as the magnetic circuit of a transformer.
Figure 2:
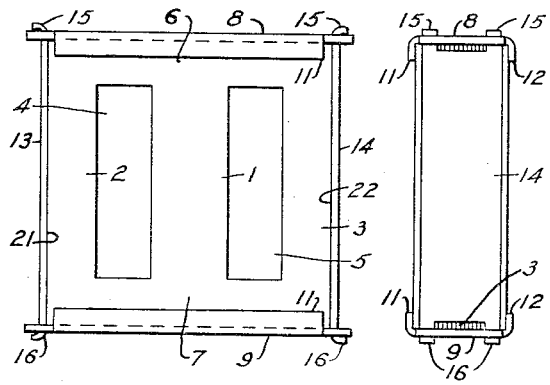
Fig. 2 is a side view of assembled members comprising an end frame for the core structure.
Figure 3:
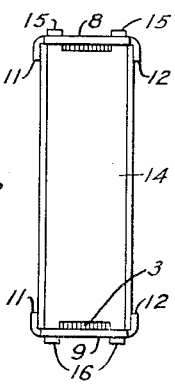
Fig. 3 is an end view of the assembled end frame structure.

Referring to the drawings, Fig. 1 illustrates an assembled stack of laminations forming a typical transformer core structure and comprising a central or winding leg 1 and two outer legs 2 and 3 with windows 4 and 5 therebetween for accommodating the transformer windings about the central leg 1 in a well-known manner, the three vertical legs being connected together by top and bottom yoke members 6 and 7. The laminated core structure may be assembled from any convenient arrangement of the magnetic steel, such as wound core loop structures or various shapes of laminations, such as I-punchings, L-punchings, or E-punchings. The shapes of the individual sheets or parts of the magnetic structure are not shown, since, for the purpose of this invention, we are concerned only in the general shape of the assembled core structure. As shown in Figs. 2 and 3, the end frame comprises top and bottom members 8 and 9, respectively, having flanges 11 and 12 at their edges which turn downwardly from the top member 8 and upwardly from the bottom frame member 9 and extend along opposite front and back faces of the stack of core laminations. The top and bottom end frame members 8 and 9 are connected by side members 13 and 14 which are similar in construction, being, in the simplified showing in Figs. 2 to 6, flat plates having a shape and area substantially that of the ends of the stack of laminations comprising core, and provided with ears 15 and 16 at the top and bottom, respectively, which extend through holes 18 and 17 at the right-hand and left-hand ends, respectively, of the top and bottom frame members 8 and 9, and in the finished form of the structure are bent outwardly away from the core structure to lock the side members to the top and bottom members of the end frame.

Figure 5:
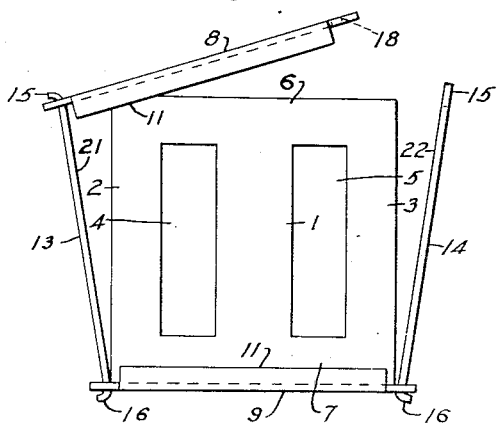

In Figs. 7 to 16, inclusive, the details of the various members which may be used to comprise the four end frame parts 8, 9, 13 and 14 are illustrated. It will be noted that the bottom frame member 9 shown in Figs. 7 and 8 is a simple, flat channel member having flanges 11 and 12 extending upwardly therefrom at the front and back edges thereof, and provided with openings 17 and 18 for receiving the cooperating ears of the side members 13 and 14, respectively, in locked position. The openings 17 and 18 near opposite ends of the member 9 are, as best shown in Figs. 2 and 5, spaced so that the inner faces 21 and 22 of the side frame members 13 and 14, respectively, are closely adjacent the edges of the stack of core laminations. The height of the side plates 13 and 14 is such as to correspond with the height of the stack of laminations forming the core, so that as they extend between the top and bottom plates 8 and 9, respectively, the core is positioned closely within the four members forming the end frame.

As shown in Figs. 9 to 14, inclusive, the side plates 13 and 14 may be provided with a channel-shaped portion 23 centrally of the end plate for stiffening it. These channel-shaped portions may also serve as guides for centering the structure in its tank. As shown in the drawings, the ears 15 and 16 at the upper and lower ends of one of the side frame members 13 are bent at right angles to the general direction of the body of the member outwardly or away from the face 21 thereof that, in its assembled position, will be adjacent the edge of the core structure. Likewise, the ears 16 at the bottom of the other end member 14 are similarly bent away from the face 22 thereof at substantially right angles thereto, but the ears 15 at the upper end thereof are left in their vertical position until the assembly of the several parts is otherwise completed.

Figure 4:
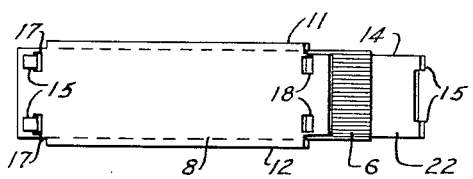
Figs. 4, 5 and 6 are respectively top, side and end views of the core structure with the end frame members partly assembled about the edges of the core to better illustrate the method of assembly employed.
Figure 6:
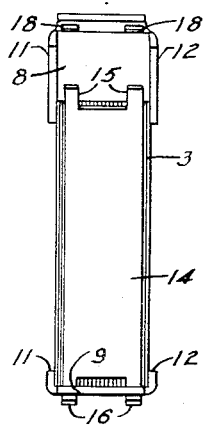

The method of assembling the end frame members will be best understood by referring to Figs. 4, 5 and 6. The bottom member 9 is so positioned as to receive the core structure between the two flanges 11 and 12, and the core is then so positioned upon the member 9 that the openings 17 and 18 adjacent the ends thereof are just clear of the opposite edges of the core structure. The end frame members 13 and 14 are next attached by inserting the bent ears 16 at the lower edges thereof through the openings 17 and 18 in the bottom plate 9 while the side frame members 13 and 14 are in a substantially horizontal position, and in then swinging these members about their lower ends, through the position shown in Fig. 5, and in similarly attaching the top member 8 to the member 13 with the ears 15 at the top of the end frame member extending through the openings 17 in one end of the top member 8, so that the four members 14, 9, 13 and 8 are connected together to form a chain linked by the cooperating ear and hole connections as described. The end frame members 13 and 14 are then brought into vertical position closely along the opposite edges of the core structure, so that the openings 18 in the end of the top member 8 will be above the upwardly extending ears 15 in the end member 14. The top member 8 is then swung about its coupled connection with the end frame 13, so that the opposite flanges 11 and 12 extend along the opposite faces of the core structure, and the ears 15 of the member 14 are inserted through the openings 18, after which they are bent outwardly, as shown in Fig. 2, to interlock the entire chain structure completing the end frame.

In Fig. 17, the several parts are shown in their completed assembly, the ears 15 of the side frame 14 being shown in dotted lines in the vertical position and in full lines in the final bentover position. The top member 8, as shown in Figs. 15, 16 and 17, has an upwardly extending channel portion 24 extending from end to end for the purpose of stiffening it, and openings 25 are provided near the opposite end thereof to provide means for attaching a lifting device to the completed structure. Projections 26 and 27 are also provided for the purpose of mounting terminal boards for guiding the conductors from the high-voltage and low-voltage windings of the completed assembly. So far as the essentials of the invention are concerned, the top and bottom members 8 and 9 may be considered as simple channel members and the end members 13 and 14 as flat plates, as shown in Figs. 2 to 6.

Since modifications of the structure illustrated and described may be made within the spirit of my invention, I do not wish to be limited otherwise than by the scope of the appended claims.

I claim as my invention:

1. A magnetic core structure assembly comprising a plurality of layers of magnetic material arranged to provide a core having a substantially rectangular periphery, and a frame surrounding the periphery comprising channel members extending along the top and bottom edges of the periphery of the core and having flanges on the front and back edges thereof extending along the front and back faces of the core and connected by a flat web portion extending between the flanges adjacent the core periphery, and connecting members extending along the two remaining edges of the substantially rectangular periphery of the core having continuous flat surfaces extending from end to end thereof and provided with ears at their ends extending through openings adjacent the ends of the channel members and bent at right angles to the general direction of the body of the connecting members outwardly away from the core to interlock the channel and connecting members forming a continuous frame closely about the periphery of the core, the connecting members being provided with channel shaped portions extending lengthwise along the central portion of the connecting members on the side thereof opposite the core engaging face.

2. A magnetic core structure assembly comprising a plurality of layers of magnetic material arranged to provide a core having a substantially rectangular periphery, and a frame surrounding the periphery comprising channel members extending along the top and bottom edges of the periphery of the core and having flanges on the front and back edges thereof extending along the front and back faces of the core and connected by a flat web portion extending between the flanges adjacent the core periphery, and connecting members extending along the two remaining edges of the substantially rectangular periphery of the core and each provided with a channel shaped portion extending lengthwise along the central portion of the connecting member on the side thereof away from the core, each connecting member having two continuous flat surfaces extending from end to end on opposite sides of the channel portion and provided with ears at the opposite ends thereof extending through openings adjacent the corners of the top and bottom channel members and bent at right angles to the general direction of the body of the connecting member outwardly away from the core to interlock the channel and connecting members forming a continuous frame closely about the periphery of the core.

3. An end frame for magnetic core structures comprising a plurality of members arranged to be readily assembled about the edges of a magnetic core structure having a substantially rectangular periphery, the frame comprising channel members extending along the top and bottom edges of the periphery of the core and having flanges on the front and back edges thereof extending along the front and back faces of the core and connected by a flat web portion extending between the flanges adjacent the core periphery, and connecting members extending along the two remaining edges of the substantially rectangular periphery of the core having continuous flat surfaces extending from end to end thereof and provided with ears at their ends extending through openings adjacent the ends of the channel members and bent at right angles to the general direction of the body of the connecting members to interlock the channel and connecting members forming a continuous frame closely about the periphery of the core, the connecting members being provided with channel shaped portions extending lengthwise along the central portion of the connecting members on the side thereof opposite the core engaging face.

ALLAN D. FORBES.